(12) United States Patent
Fang et al.

(10) Patent No.: US 12,322,196 B2
(45) Date of Patent: Jun. 3, 2025

(54) TECHNIQUES FOR ENABLING ON-DEVICE SHAPE RECOGNITION

(71) Applicant: Microsoft Technology Licensing, LLC, Redmond, WA (US)

(72) Inventors: Biyi Fang, Kirkland, WA (US); Yibo Sun, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 17/981,208

(22) Filed: Nov. 4, 2022

(65) Prior Publication Data
US 2024/0153298 A1    May 9, 2024

(51) Int. Cl.
| | | |
|---|---|---|
| *G06V 10/82* | (2022.01) | |
| *G06N 3/082* | (2023.01) | |
| *G06T 11/20* | (2006.01) | |
| *G06V 30/19* | (2022.01) | |
| *G06V 30/32* | (2022.01) | |

(52) U.S. Cl.
CPC ............ *G06V 30/36* (2022.01); *G06N 3/082* (2013.01); *G06T 11/203* (2013.01); *G06V 10/82* (2022.01); *G06V 30/19147* (2022.01); *G06T 2200/24* (2013.01)

(58) Field of Classification Search
CPC .. G06V 30/36; G06V 30/19147; G06V 10/82; G06N 3/082; G06T 11/203; G06T 2200/24
USPC ......................................................... 345/441
See application file for complete search history.

(56) References Cited

U.S. PATENT DOCUMENTS

| | | | |
|---|---|---|---|
| 2020/0302163 A1* | 9/2020 | Shi | ........................ G06V 10/273 |
| 2023/0008856 A1* | 1/2023 | Henry | .................... G06F 9/5027 |
| 2023/0017425 A1* | 1/2023 | Bereciartua-Perez | ....................... G06T 7/0002 |

OTHER PUBLICATIONS

Zawish, M., et al., "Complexity-DrivenCNNCompressionforResource-constrainedEdgeAI" (Year Aug. 26, 2022), arxiv.org, Cornell University Library, 201 Olin Library Cornell University Ithaca, NY 14853, Aug. 26, 2022, 11 pages, XP091304270.*
"Quantize ONNX Models", Retrieved From https://onnxruntime.ai/docs/performance/quantization.html#method-selection, Dec. 12, 2022, 8 Pages.
Sandler, et al., "MobileNetV2: Inverted Residuals and Linear Bottlenecks", Retrieved From https://arxiv.org/abs/1801.04381, Mar. 21, 2019, 14 Pages.

(Continued)

*Primary Examiner* — Hai Tao Sun
(74) *Attorney, Agent, or Firm* — Novo TechIP International PLLC

(57) ABSTRACT

A data processing system implements training a first convolutional neural network (CNN) to classify shapes in digital ink inputs, the first CNN being trained to receive ink stroke information as an input and to output an indication whether the ink stroke information represents a hand drawn geometric shape. The data processing system further implements compressing the first CNN to generate a second CNN capable of being operated on a resource-constrained computing device lacking sufficient computing resources to operate an instance of the first CNN and installing the second CNN on the resource-constrained computing device to process ink stroke information captured by a user interface of the computing device.

20 Claims, 17 Drawing Sheets

(56) References Cited

OTHER PUBLICATIONS

International Search Report and Written Opinion received for PCT Application No. PCT/US2023/033663, Dec. 11, 2023, 8 pages.
Peterson E.J., et al., "Grouping Strokes into Shapes in Hand-Drawn Diagrams", Proceedings of the AAAI Conference On Artificial Intelligence, vol. 24, No. 1, Dec. 31, 2010, pp. 974-979, XP93105135.
Zawish, M., et al., "Complexity-Driven CNN Compression for Resource-constrained Edge AI", arxiv.org, Cornell University Library, 201 Olin Library Cornell University Ithaca, NY 14853, Aug. 26, 2022, 11 pages, XP091304270.

* cited by examiner

TECHNIQUES FOR ENABLING ON-DEVICE SHAPE RECOGNITION

BACKGROUND

Digital ink enables users to draw and write on a computing device using a stylus, a finger, a mouse, or other input device. Many of the features associated with digital ink rely on deep learning models to analyze user inputs to support these features. These features include determining whether digital ink strokes input by a user include handwriting or a drawing. The models used include shape classification models that determine whether the digital ink strokes input by the user includes a drawing of a particular shape. Other types of deep learning models may be used to analyze digital ink strokes to provide different types of services to the user.

Due to the size and complexity of the models used to implement these services, the services are typically implemented by cloud-based service platforms. These platforms receive ink stroke information captured by the client device of users and analyze the ink stroke information to provide various services to the users. However, this approach requires network connectivity, and the user experience will suffer when network connectivity is slow. An alternative to this approach is to implement an instance of the deep learning model locally on the user device, but many devices do not have the computing, memory, and/or storage resources required to support a local instance of the deep learning models. Hence, there is a need for improved systems and methods that provide a technical solution for implementing such deep learning models on resource-constrained devices.

SUMMARY

An example data processing system according to the disclosure may include a processor and a machine-readable medium storing executable instructions. The instructions when executed cause the processor to perform operations including training a first convolutional neural network (CNN) to classify shapes in digital ink inputs, the first CNN being trained to receive ink stroke information as an input and to output an indication whether the ink stroke information represents a hand drawn geometric shape; compressing the first CNN to generate a second CNN capable of being operated on a resource-constrained computing device lacking sufficient computing resources to operate an instance of the first CNN; and installing the second CNN on the resource-constrained computing device to process ink stroke information captured by a user interface of the computing device.

An example data processing system according to the disclosure may include a processor and a machine-readable medium storing executable instructions. The instructions when executed cause the processor to perform operations including receiving a digital ink stroke information via a user interface of a client device; rendering a representation of the digital ink stroke information on a display of the client device; providing the digital ink stroke information to a first convolutional neural network (CNN) implemented on the client device, the first CNN being a compressed version of a second CNN, the client device lacking sufficient computing resources to operate an uncompressed instance of the second CNN, the second CNN being trained to receive ink stroke information as an input and to output an indication whether the ink stroke information represents a hand drawn geometric shape; obtaining the indication whether the ink stroke information includes a hand drawn geometric shape; and replacing the rendering of the digital ink stroke information with a computer-generated representation of the hand drawn geometric shape included in the digital ink stroke information.

An example method implemented in a data processing system for training a machine learning model includes training a first convolutional neural network (CNN) to classify shapes in digital ink inputs, the first CNN being trained to receive ink stroke information as an input and to output an indication whether the ink stroke information represents a hand drawn geometric shape; compressing the first CNN to generate a second CNN capable of being operated on a resource-constrained computing device lacking sufficient computing resources to operate an instance of the first CNN; and installing the second CNN on the resource-constrained computing device to process ink stroke information captured by a user interface of the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
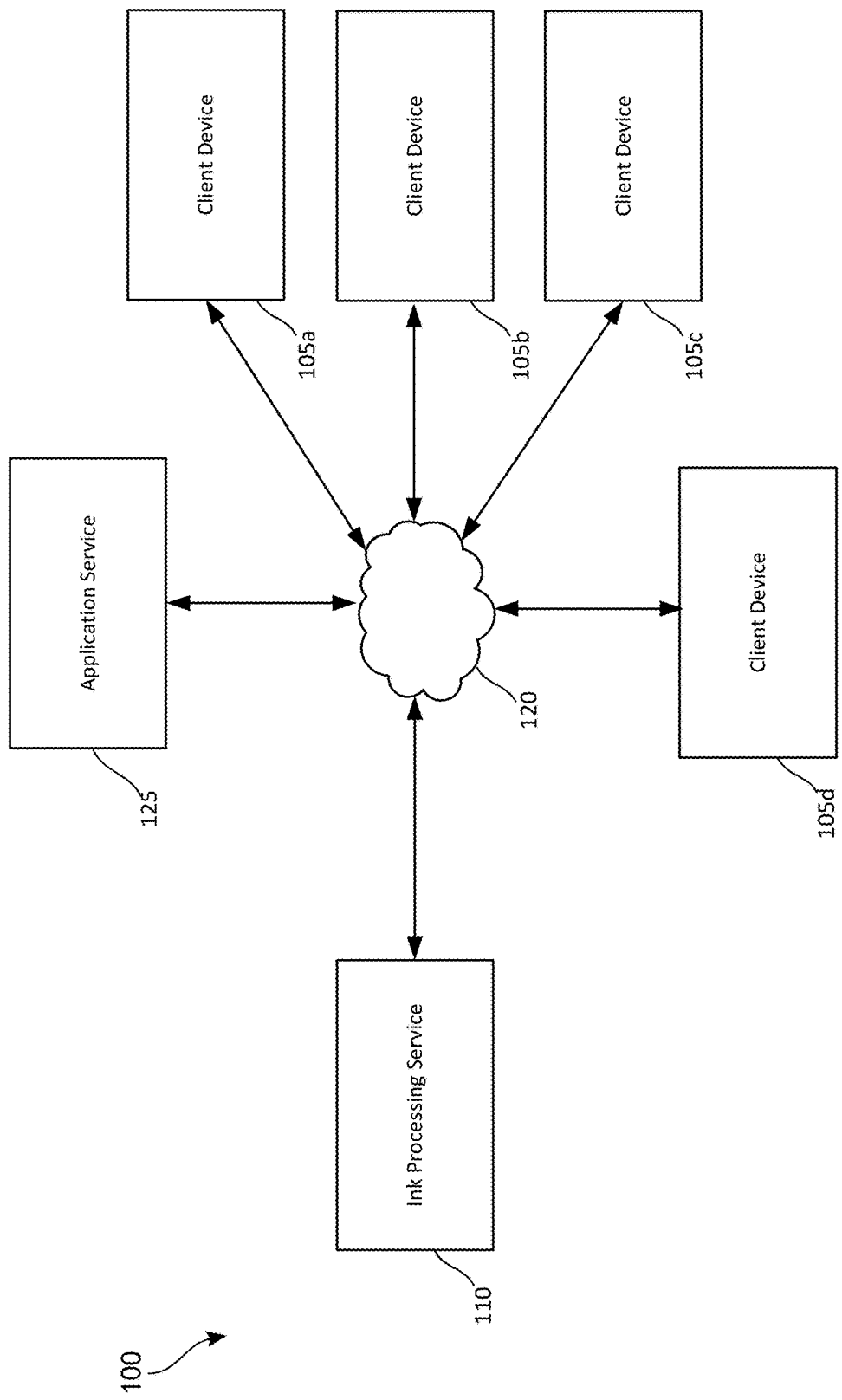
FIG. 1A is a diagram showing an example computing environment in which the techniques disclosed herein for digital ink processing may be implemented.

Techniques for compressing the architecture of a deep learning model are provided to enable execution of instances of the deep learning model on resource-constrained devices that lack the computing resources to execute an instance of the uncompressed model. These techniques can be used to compress convolutional neural networks (CNNs) to permit these models to be operated on resource-constrained devices that would otherwise be unable to operate such models. Such devices typically have slow or limited network connectivity that precludes these devices from relying on models implemented by cloud-based services, because the latency introduced by the network connectivity constraints would significantly degrade the user experience.

The techniques described herein can be used to implement models for analyzing ink stroke information locally on such resource-constrained devices. These models can be used to enable on-device shape recognition, classification of ink stroke information as handwriting or drawings, and other on-device services that would typically be implemented by a cloud-based service. Resource-constrained devices have slow or limited network connectivity and could not rely on such cloud-based services.

The techniques provided herein alter the model architecture of the shape-recognition model and/or other models to enable instances of these models to be implemented on a resource-constrained user device instead of a cloud-based service. In some implementations, the standard convolution layers of the model are replaced with depthwise separable convolution layers, which significantly decreases the number of floating-point operations performed by the convolution layer. The number of filters of the convolution layer is reduced, in some implementations, to further reduce the complexity of the model, thereby further reducing the computing and memory resources required to execute an instance of the model. The techniques herein further decrease the size of the model through quantization and graph optimization. Quantization refers to performing computations and storing tensors at a lower bitrate than at floating point precision. Graph optimization is used to eliminate layers from the model that are only useful for training and by computing constant values preemptively. A technical benefit of this approach is that the size of the model can be substantially decreased without substantially decreasing the accuracy of the models. Consequently, the models can be implemented locally on user devices that would not otherwise have the processing and/or memory resources to implement unmodified instances of the models.

The performance of the models is also improved through data augmentation in some implementations. Training data is selected that is similar to that which the model is likely to encounter when in use by end users. A technical benefit of data augmentation is the performance of the models can be improved to offsets potential slight decreases in accuracy of the models which may have resulted from compression of the models.

These techniques provided herein can offer an improved user experience for users of resource-constrained user devices that have limited network access and/or limited computing and/or memory resources without compromising the accuracy of the prediction of the models. While many of the examples which follow utilize the model compression techniques to implement shape classification models or models for classifying ink stroke data as handwriting or drawings, the techniques described here are not limited to these specific types of models. These techniques can be applied to compress deep learning models trained to provide other types of predictions to permit these models to be implemented locally on resource-constrained devices. These and other technical benefits of the techniques disclosed herein will be evident from the discussion of the example implementations that follow.

FIG. 1A is a diagram showing an example computing environment 100 in which the techniques disclosed herein for enabling on-device shape recognition for digital ink applications may be implemented. The computing environment 100 includes an ink processing service 110. The example computing environment 100 also includes client devices 105a, 105b, 105c, and 105d (collectively referred to as client device 105) and application services 125. The client devices 105a, 105b, 105c, and 105d communicate with the ink processing service 110 and/or the application service 125 via the network 120. Furthermore, the application service 125 communicates with the ink processing service 110 via the network 120. The network 120 may be a combination of one or more public and/or private networks and may be implemented at least in part by the Internet.

In the example shown in FIG. 1A, the ink processing service 110 is implemented as a cloud-based service or set of services. The ink processing service 110 is configured to analyze digital ink information obtained from an application implemented on the ink processing service 110 and/or the application service 125. The ink processing service 110 implements one or more machine learning models configured to analyze ink stroke data to support the various services provided by the ink processing service 110. In some implementations, the ink processing service 110 implements a machine learning model trained to classify ink strokes as writing or a drawing. The ink processing service 110 is configured to convert handwriting detected in the ink stroke data into text in some implementations. The ink processing service 110 is also configured to identify and convert hand drawn shapes into standardized representations of those shapes. In some implementations, the ink processing service 110 implements a machine learning model trained to classify shapes in the ink stroke data. The ink processing service 110 may provide other types of services associated with digital ink processing and may implement additional machine learning models to provide these services.

The application service 125 provides cloud-based software and services that are accessible to users via the client devices 105a-105d. The application service 125 provides one or more software applications, including but not limited to communications platform and/or collaboration platform, a word processing application, a presentation design application, and/or other types of applications in which the user may create and/or access electronic content. The electronic content may be stored on the ink processing service 110 and/or the client devices 105a-105d. The term "electronic content" as used herein can be representative of any document or component in electronic form that can be created by a computing device, stored in a machine-readable storage medium, and/or transferred among computing devices over a network connection or via a machine-readable storage medium. Examples of such electronic documents include but are not limited to word processing documents, program code, presentations, websites (e.g., Microsoft SharePoint® sites), digital drawings, media files, components thereof, and the like. The one or more software applications provided by the application service 125 are configured to receive ink stroke data from users via the client devices 105a-105d and utilize the ink processing service 110 to process the received ink stroke data provided as input by users via the respective client devices 105a-105d of the users. The one or more applications may be configured to permit the user to provide handwritten and/or drawn content, and the one or more applications may utilize the services provided by the ink processing service 110 to analyze handwritten and/or drawn content.

The client devices 105a, 105b, 105c, and 105d are each a computing device that may be implemented as a portable electronic device, such as a mobile phone, a tablet computer, a laptop computer, a portable digital assistant device, a portable game console, and/or other such devices. The client devices 105a, 105b, and 105c may also be implemented in computing devices having other form factors, such as a desktop computer, vehicle onboard computing system, a kiosk, a point-of-sale system, a video game console, and/or other types of computing devices. While the example implementation illustrated in FIG. 1A includes four client devices, other implementations may include a different number of client devices 105 that utilize the application service 125 and/or the ink processing service 110. Furthermore, in some implementations, the application functionality provided by the application service 125 is implemented by a native application installed on the client devices 105a, 105b, 105c, and 105d, and the client devices 105a, 105b, 105c, and 105d communicate directly with the ink processing service 110 over a network connection.

In some implementations, the ink processing service 110, or at least a portion of the functionality thereof, is implemented by the application services 125 to provide digital ink related services for users of the application services. In other implementations, the ink processing service 110, or at least a portion of the functionality thereof, is implemented by a native application on the client devices 105a-105d. In such implementations, the client device 105 can include local instances of one or more of the machine learning models utilized by the ink processing service 110. The techniques provided herein can be used to reduce the size and complexity of the machine learning models to permit instance of the models to be implemented on the client device 105. The client device 105 may be a resource constrained device that has limited processing, memory, and/or storage capacity which would be unable to support an instance of the model or models that has not been reduced in size and/or complexity using the techniques provided herein.

Figure 1B:
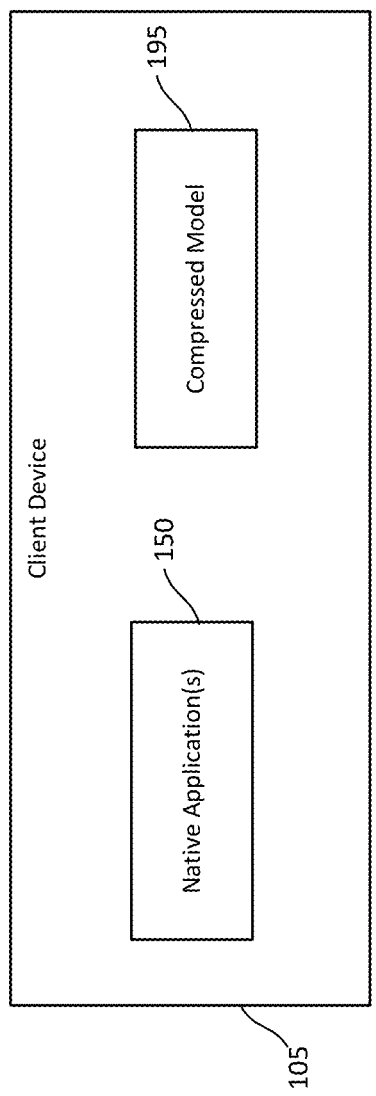
FIG. 1B is a diagram showing an implementation of a client device in which the ink processing functionality has been implemented on the client device using a compressed model.

FIG. 1B is a diagram showing an implementation of a client device 105 in which the ink processing functionality has been implemented on the client device using a compressed model 195. In some implementations, the client device 105 is a resource-constrained device. The client device 105 has limited network connectivity for accessing the services provided by the application service 125 and/or the ink processing service 110. In such implementations, the client device 105 may implemented as a standalone device. In other implementation, the client device 105 may be unable to access the services provided by the application service 125 and/or the ink processing service 110, or the limited network connectivity available to the client device 105 would introduce too much latency and the user experience would be significantly degraded. To address such network connectivity issues or lack of network connectivity in standalone device, instances of the machine learning models utilized by the ink processing service 110 can be implemented on the client device 105. However, the size and complexity of the versions of the models implemented by the ink processing service 110 would typically exceed the processing, memory, and storage resources of a resource-constrained device. Thus, the techniques provided herein can be used to implement instances of these models that utilize a modified architecture that is smaller and less complex and can be implemented locally on a resource-constrained client device 105. The one or more native applications 150 of the client device 105 utilize the local instances of the models rather than relying on the ink processing service 110 to analyze ink stroke information. Details of how the model architecture is modified to permit the compressed model 195 to be implemented on such a resource-constrained device are described in the examples which follow.

Figure 2:
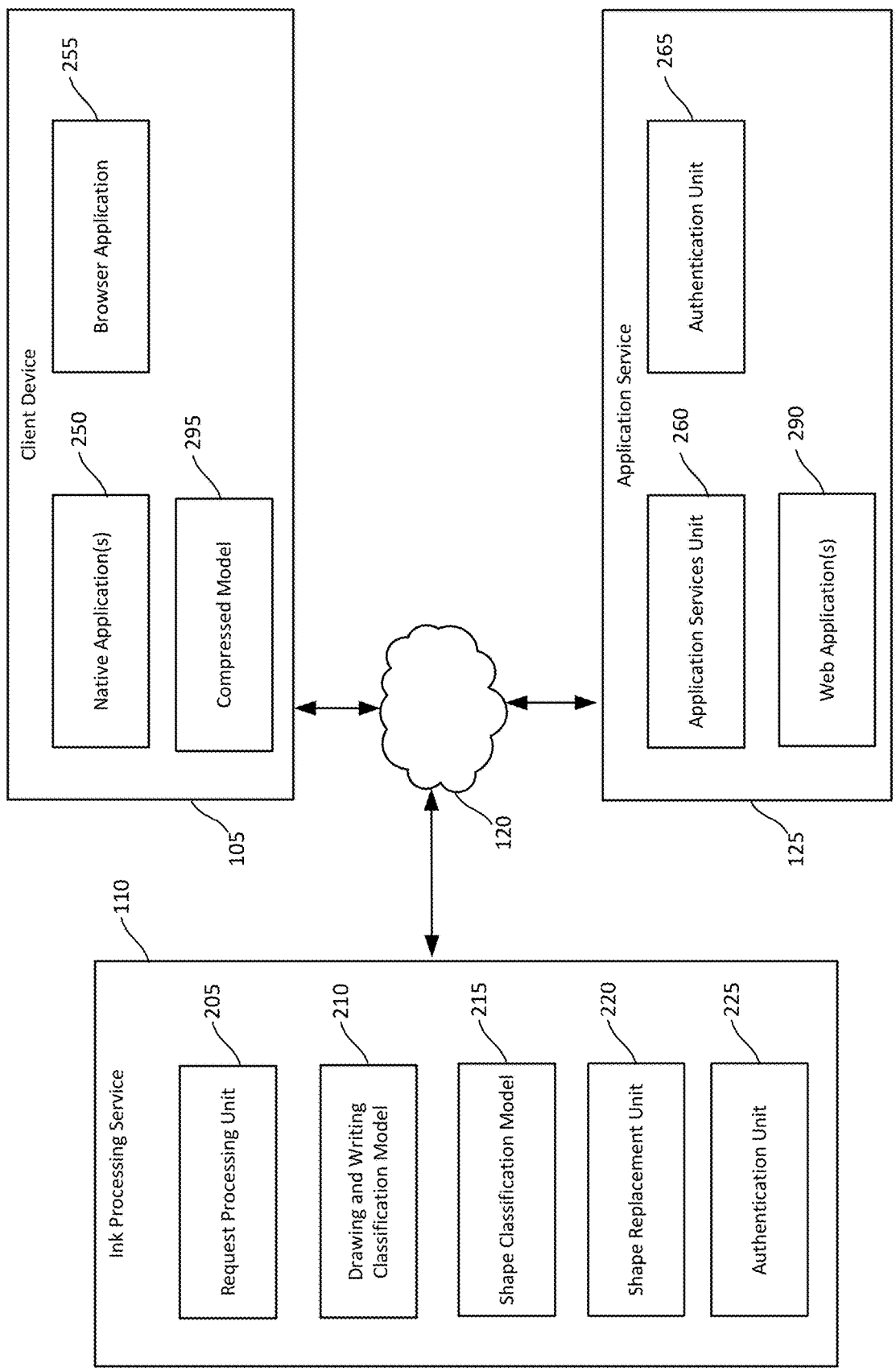
FIG. 2 is a diagram showing additional features of the ink processing service, the client device, and the application service shown in FIG. 1A.

FIG. 2 is a diagram showing additional features of the ink processing service 110, the client device 105, and the application service 125. The ink processing service 110 includes a request processing unit 205, a drawing and writing classification model 210, a shape classification model 215, a shape replacement unit 220, and an authentication unit 225.

The request processing unit 205 receives incoming requests for services provided by the ink processing service 110 from the client device 105 and/or the application service 125. The incoming request includes ink stroke information captured by the client device 105. The ink stroke information may include ink strokes representing handwriting and/or drawings. The ink stroke information may also include link thickness information, trajectory information, speed information, direction information, locations of sample points, and/or other information that may be used to render a representation of the ink stroke data and/or analyze the ink stroke data to provide various services. The request specifies a service to be performed on the ink stroke data in some implementations. In some implementations, the request is a request for classification of the ink stroke data as a drawing or as handwriting, and the request processing unit 205 provides the ink stroke information to the drawing and writing classification model 210 for analysis. The drawing and writing classification model 210 outputs a prediction regarding whether the ink stroke information represents handwriting or a drawing. The request processing unit 205 sends a response to the client device 105 or the application service 125 with an indication that the ink stroke information represents one of handwriting or a drawing, based on the prediction output by the drawing and writing classification model 210. In some implementations, the request is a request for shape classification, and the request processing unit 205 provides the ink stroke information to the shape classification model 215. The shape classification model 215 outputs a prediction that the ink stroke information represents a particular shape, if any. The request processing unit 205 then sends a response to the client device 105 or the application service 125 with an indication of the shape predicted by the shape classification model 215. In some implementations, the request is a request for shape classification and beautification. In such implementations, the request processing unit 205 provides the shape classification output by the shape classification model 215 and the ink stroke information to the shape replacement unit 220. In response, the shape replacement unit 220 replaces the hand drawn shape represented by the ink stroke data with a geometric object representing the hand drawn shape. The request processing unit 205 then sends a response to the client device 105 or the application service 125 that includes information identifying the geometric object representing the hand drawn shape.

The drawing and writing classification model 210 is a classification model trained to determine whether ink stroke data represents a drawing or handwriting. The drawing and writing classification model 210 is implemented by a CNN or other deep learning model. In some implementations, the request processing unit 205 is configured to preprocess the ink stroke information to extract feature information and to provide the extracted feature information to the drawing and writing classification model 210 as an input. The drawing and writing classification model 210 is trained using training data that trains the model to discriminate between drawings and handwriting. The model may be trained to recognize handwriting in multiple languages, alphabets, syllabaries, and/or other written language representations.

The shape classification model 215 is a classification model trained to determine whether ink stroke data represents a geometric shape which the model has been trained to recognize. The geometric shapes may include closed figures, such as but not limited to polygons and circles. The geometric shapes may include line segments and curves in some implementations. The shape classification model 215 is implemented by a CNN or other deep learning model. In some implementations, the request processing unit 205 is configured to preprocess the ink stroke information to extract feature information and to provide the extracted feature information to the shape classification model 215 as an input.

The shape replacement unit 220 is configured to receive ink stroke information and an indication of the shape represented by the ink stroke information as an input and to output a geometric object representing the shape. The shape replacement unit 220 provides means for replacing hand drawn representations of shapes with clean, formalized representations of those shapes. The shape replacement unit 220 is configured to determine attributes of the geometric object based on the hand drawn representation of the shape in the ink stroke information, such as the size of the geometric object, the line width and/or color, and/or other attributes of the geometric object. FIGS. 5A-5D show examples of the replacement of hand drawn shapes with formal representations of these shapes.

The authentication unit 225 provides functionality for verifying whether users are permitted to access the services provided by the ink processing service 110. In some implementations, the authentication unit 225 provides functionality for receiving authentication credentials for the users from their respective client device 105 and/or from the application service 125. The authentication unit 225 may be configured to verify that the authentication credentials are valid and permit the users to access the services provided by the ink processing service 110 responsive to the authentication credentials being valid.

The application service 125 includes an application services unit 260 and/or an authentication unit 265. The application services unit 260 provides functionality for users to consume, create, share, collaborate on, and/or modify various types of electronic content. The electronic content includes digital ink handwriting and/or drawings in some instances. The application services unit 260 may utilize the ink processing service 110 to analyze ink stroke information associated with ink-based inputs provided by a user via the client device 105. In some implementations, the application services unit 260 provides a web-based interface to enable users to access at least a portion of the services provided by the application service 125. In other implementations, users may access the services provided by the application service 125 via one or more native applications 250 installed on the client device 105. The application services unit 260 may in turn obtain the services provided by the ink processing service 110.

The authentication unit 265 provides functionality for verifying whether users are permitted to access the services provided by the application service 125 and/or the ink processing service 110. In some implementations, the authentication unit 265 provides functionality for receiving authentication credentials for the users from their respective client device 105. In such implementations, the authentication unit 265 verifies that the authentication credentials are valid and permit the users to access the services and/or documents provided by the application service 125 and/or the ink processing service 110, responsive to the authentication credentials being valid.

The client device 105 shown in FIG. 2 may be similar to those shown in the preceding figures. The client device 105 may include one or more native applications 250, a browser application 255, and a compressed model 295. In some implementations, the one or more native applications 250 includes a native application configured to communicate with the application service 125 to enable users to consume, create, share, collaborate on, and/or modify electronic content using the services provided by the application service 125. In some implementations, the one or more native applications 250 includes a native application configured to communicate with the ink processing service 110. In such implementations, the native application provides an interface for users to interact with the ink processing service 110 and/or the application service 125. Examples of such a user interface are shown in FIGS. 5A-5D.

The compressed model 295 is a compressed version of the ink processing models used by the ink processing service 110 and may be similar to the compressed model 195 shown in FIG. 1B. The compressed model 295 may be used by client device 105 in instances where network connectivity is unavailable, slow, or otherwise constrained. The native applications 250 can utilize the compressed model 295, which are implemented locally on the client device and compressed according to the techniques disclosed herein to provide the ink processing services that would otherwise be provided by the ink processing service 110.

The browser application 255 is an application for accessing and viewing web-based content, the web-based content may be provided by the application service 125 and/or the ink processing service 110. The application services 125 may provide a web application 290 that enables users to consume, create, share, collaborate on, and/or modify content. A user of the client device 105 may access the web application 290 via the browser application 255 and the browser application renders a user interface for interacting with the application services 125 in the browser application 255. The browser application 255 may be used to access the services provided by the application service 125 and/or the ink processing service 110 in instances in which the client device 105 is not subjected to network connectivity constraints.

The application services 125 and/or the ink processing service 110 may support both the one or more web-enabled native applications 250 and one or more web applications 290, and the users may choose which approach best suits their needs. The ink processing service 110 may also provide support for the one or more native applications 250, the browser application 255, or both to provide functionality for a user of the client device 105 to obtain the services provided by the ink processing service 110.

FIGS. 3A-3E are diagrams showing example of modifications that can be made to the architecture of the machine learning models, such as but not limited to the drawing and writing classification model 210 and the shape classification model 215, to permit instances of the models to be implemented locally on a resource-constrained client device 105. In some implementations, one or more of the techniques shown in FIGS. 3A-3E are used to reduce the size and complexity of the models to permit the models to be implemented on a resource-constrained client device 105. The example convolutional layers shown in in FIGS. 3A-3E are intended to illustrate the concepts described herein and may be part of a larger model which is not shown in the figures in the interest of clarity.

Figure 3A:
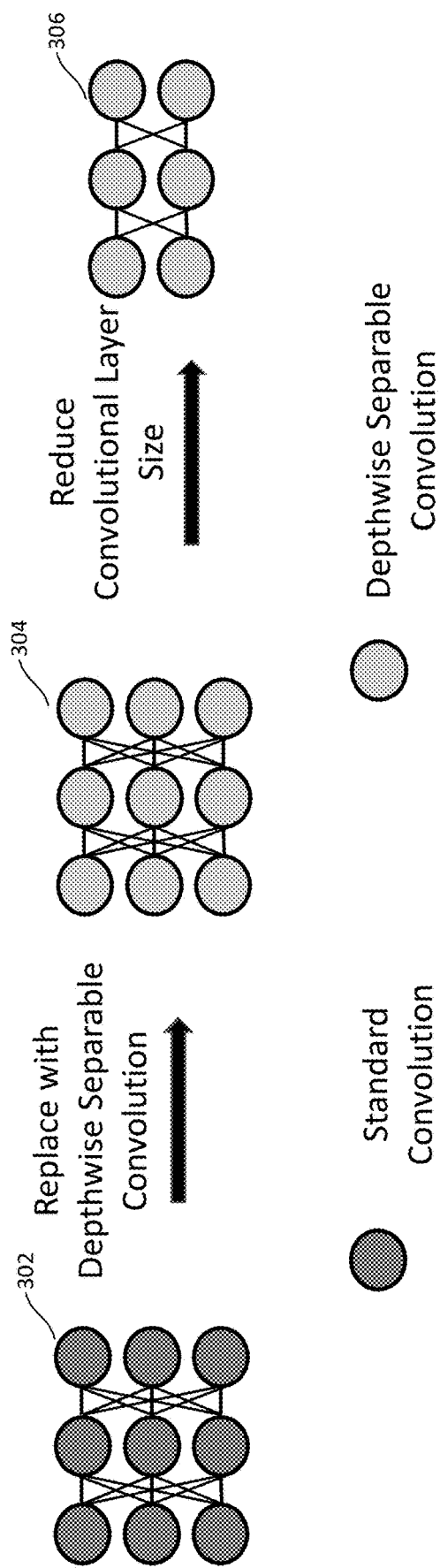
FIGS. 3A-3E are diagrams showing example of modifications that can be made to the architecture of the machine learning models shown in the preceding examples to enable these models to be implemented on a resource-constrained client device instead of the ink processing service.

FIG. 3A shows an example of one of these modifications in which the standard convolution layer 302 of a CNN model is replaced with a depthwise separable convolution layer 304. In some implementations, an architecture similar to that of the MobileNetV2 architecture is used to implement the depthwise separable conversion layer 304. The MobileNetV2 architecture was developed to provide highly accurate deep neural networks to smartphones and other such resource-constrained devices. Depthwise spatial convolution is an alternate approach to standard convolution in which a spatial convolution is performed followed by depthwise convolution. A technical benefit of this approach is that depthwise spatial conversion decouples the spatial and depthwise information, which in turn reduces the complexity and number of floating-point calculations that are performed by the convolution layer.

FIG. 3A also shows that the architecture of the model can be further modified to reduce complexity by reducing the size of the convolutional layer to produce a smaller convolutional layer 306. The width of the convolutional layer is reduced by eliminating filters from the convolutional layer. The reduction in the width of the model can be determined during the training process. Instance of the model having a smaller convolutional layer can be tested to determine whether the accuracy of the model satisfies at least a threshold accuracy until a minimum size for the convolutional layer is determined that still satisfies the threshold accuracy. A technical benefit of this approach is that the complexity of the convolutional layer is reduced, which further reduces the computing, memory, and storage resources required to implement the model on a resource-constrained model.

Figure 3B:
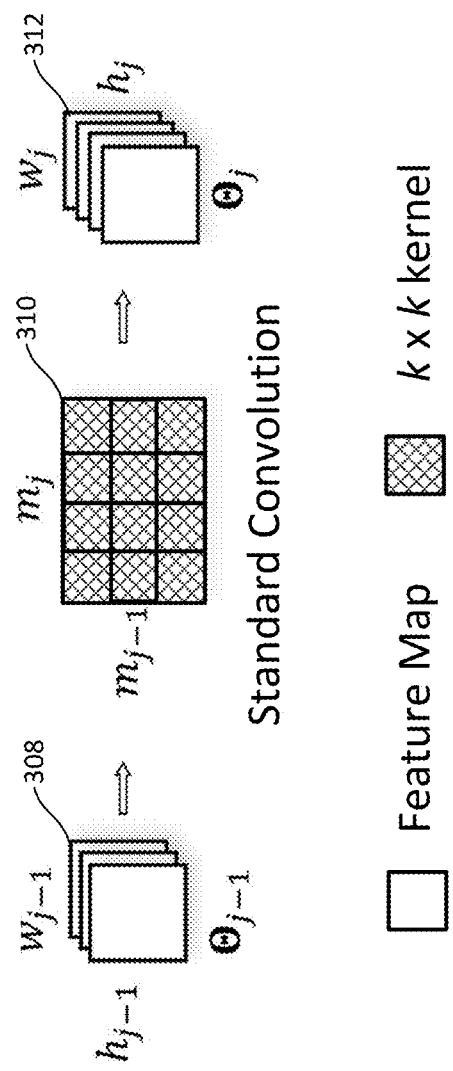

FIG. 3B shows an example configuration of a standard convolution layer 310. The input of the standard convolution layer 310 is a feature map 308 that may be extracted from an input to the neural network or is the output of another convolutional layer of the neural network. The standard convolution layer 310 utilizes a k×k kernel 310 that performs convolution on the input feature map 308 to extract the feature map 312.

Figure 3C:
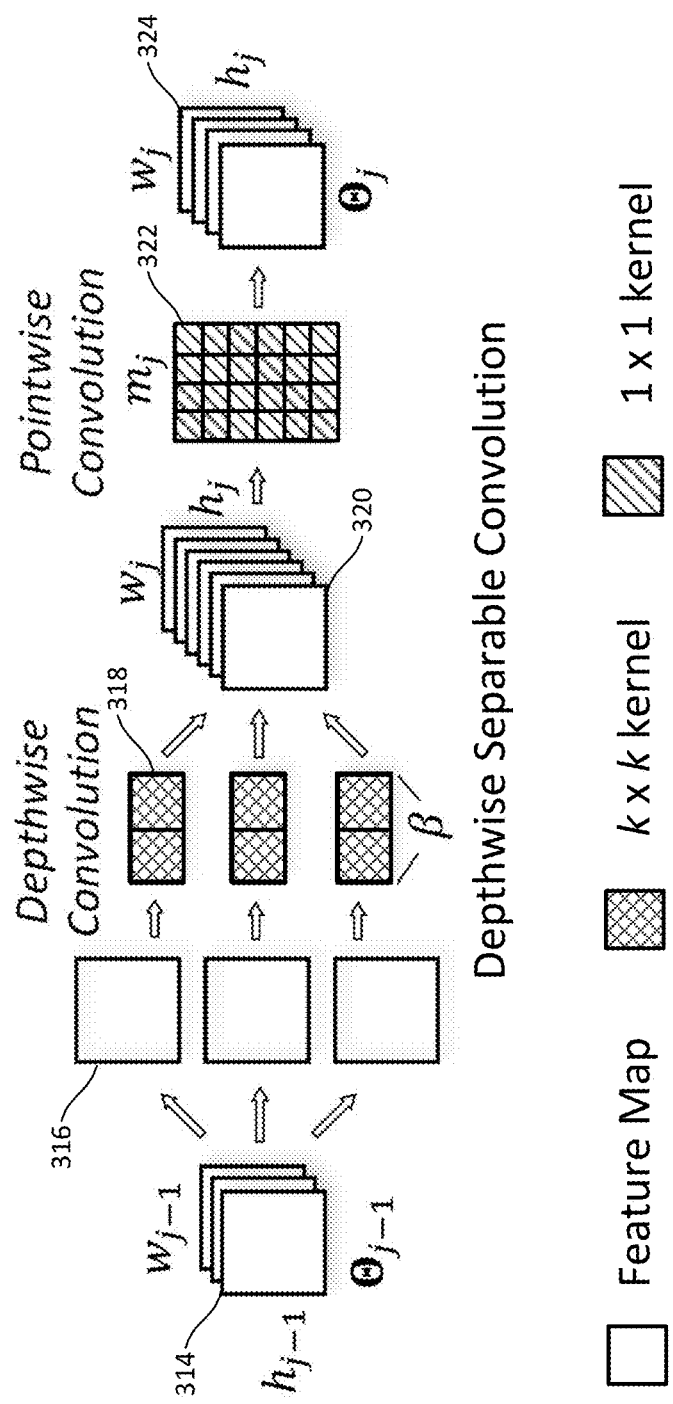

FIG. 3C shows an example configuration of a depthwise separable convolution layer in which the depthwise convolution 318 and the pointwise convolution 322 have been implemented as separate layers. The input 314 and the output 324 are of the same size as the input 308 and the output 312 of the standard convolutional layer implementation shown in FIG. 3B, but the complexity of the floating-point computations to be performed by the separable convolution layer shown in FIG. 3B are significantly less complex that those performed in the standard convolution layer. In the separable convolution layer, the input 314 is divided by channel into a plurality of channel-specific inputs 316. Therefore, each of the j channels will have a separate input into a respective one of the j filters 318 configured to perform the convolution at the depthwise convolution layer. The features 320 output by the depthwise convolution layer include a set of features extracted by each of the j filters of the depthwise convolution layer. The features 320 are provided as an input to the pointwise convolution layer 322, which implements a 1×1 kernel. The pointwise convolutional layer convolves the features 320 to generate the features 324. A technical benefit of the depthwise separable convolution approach shown in FIG. 3C is that this approach reduces the number of floating-point calculations performed by approximately tenfold compared with the standard convolution approach shown in FIG. 3B. Consequently, the processing, memory, and storage resources required to implement such a model on a client device 105 are significantly reduced, which can help ensure that the model can be implemented on resource-constrained client devices that would otherwise lack the computing resources to implement a model that implements standard convolution, such as that shown in FIG. 3B.

Figure 3D:
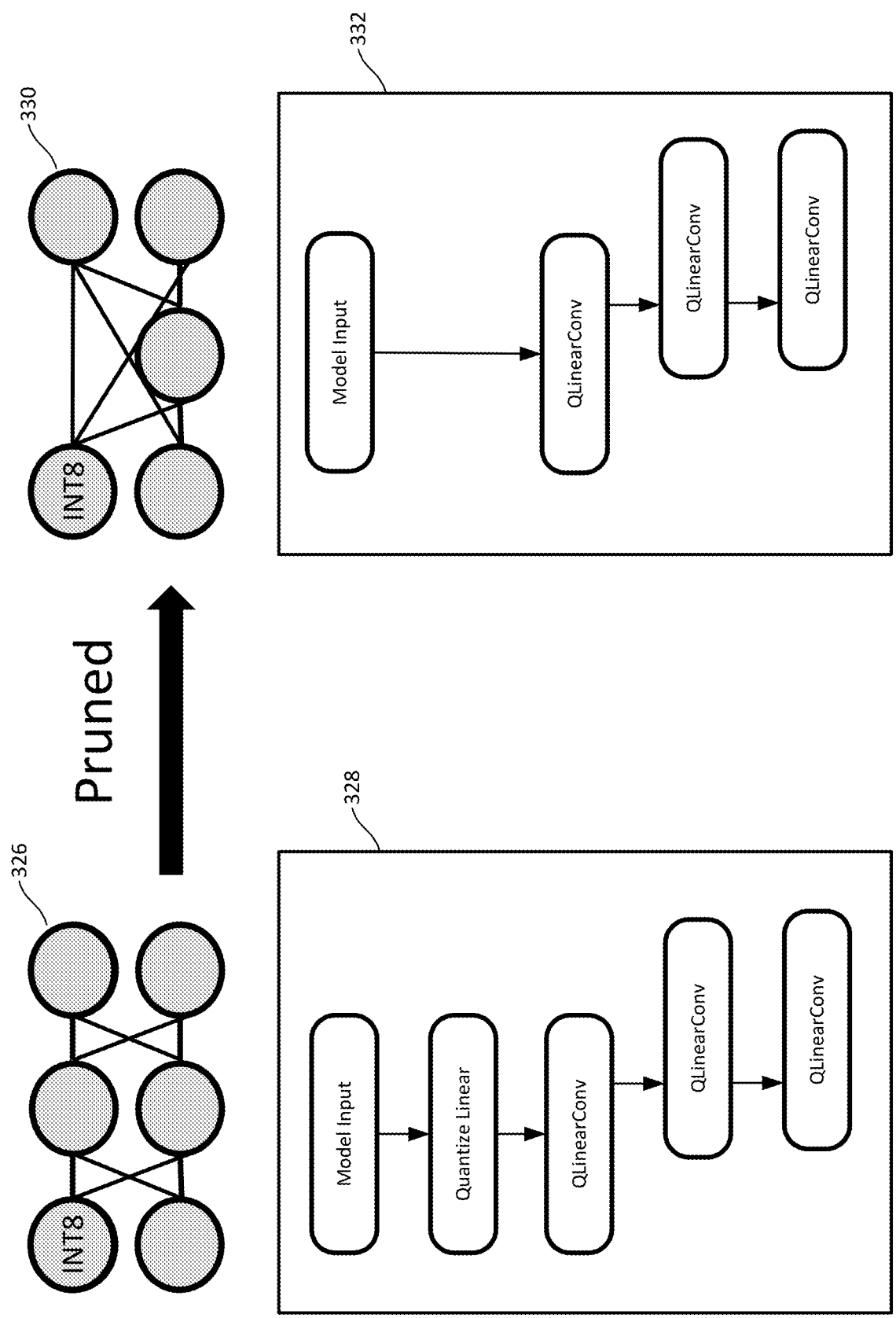

FIG. 3D is a diagram showing a model pruning technique that can be used to further alter the architecture of the machine learning model, such as but not limited to the drawing and writing classification model 210 and the shape classification model 215, to permit instances of the model to be implemented locally on a resource-constrained client device 105. In the example shown in FIG. 3D, the convolution layer 326 is shown with a corresponding graph 328 which represents the model. In some implementations, the model can be optimized by removing layers that are useful for training the model, such as but not limited to the identity layer and the dropout layer but are not useful once the model has been trained. These layers can be removed as shown in the modified graph 332 to generate a simplified version of the convolutional layer 330. The model pruning technique can also implement constant folding, in which constant values are computed preemptively rather than at runtime. A technical benefit of the model pruning techniques is that the processing, memory, and storage resources required to implement such a model on a client device 105 are significantly reduced, which can help ensure that the model can be implemented on resource-constrained client devices that would otherwise lack the computing resources to implement the model.

Figure 3E:
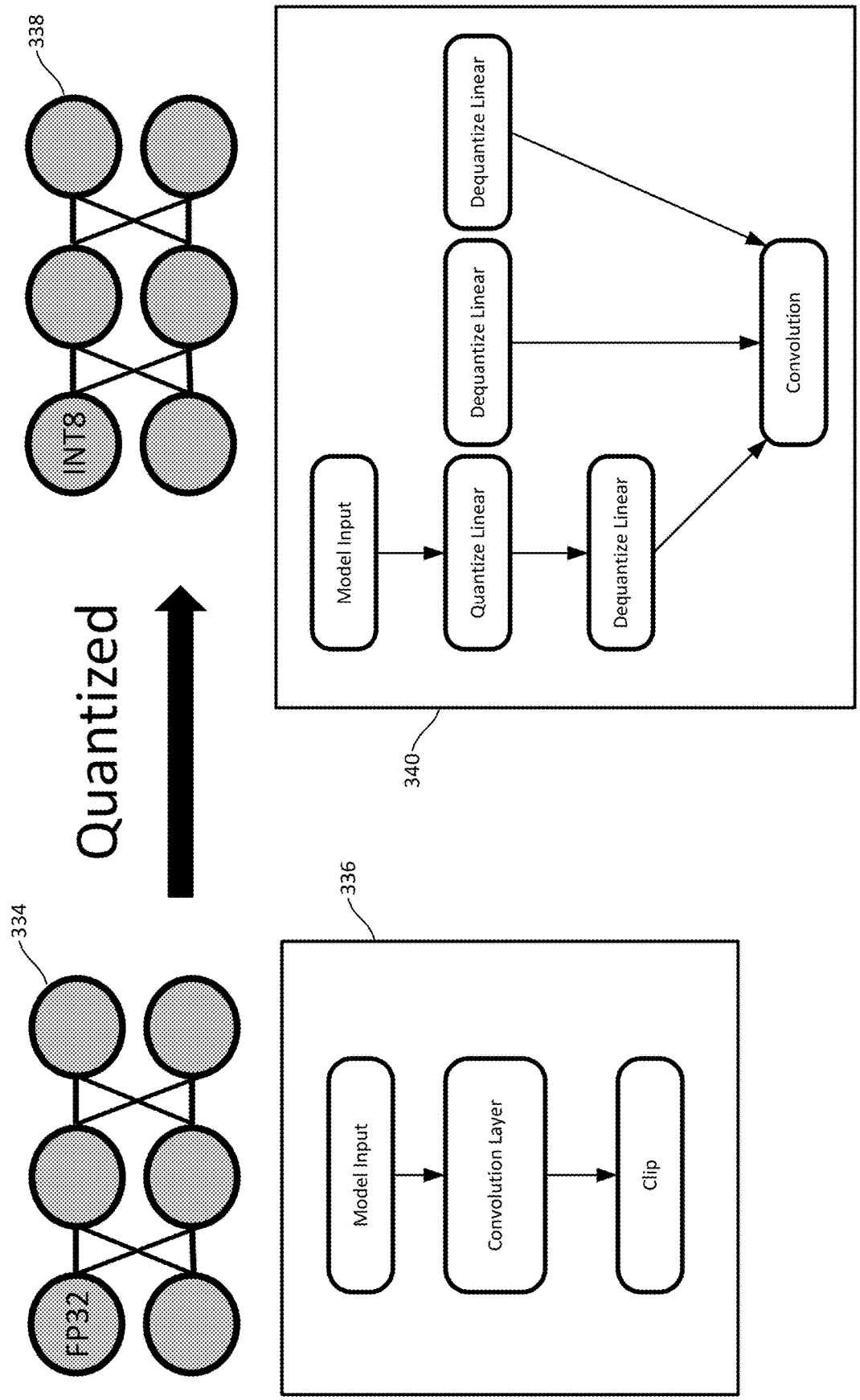

FIG. 3E is a diagram showing a model quantization technique that can be used to further alter the architecture of the machine learning model, such as but not limited to the drawing and writing classification model 210 and the shape classification model 215, to permit instances of the model to be implemented locally on a resource-constrained client device 105. Quantization refers to techniques for performing computations and storing the model tensors at lower bitwidths than floating point precision that would typically be used in a standard implementation of a CNN or such machine learning model. The quantized model executes some or all mathematical operations on tensors using integers rather than floating point values. A technical benefit of this approach is that quantization provides a more compact model representation. In some implementations, 32-bit floating point (FP32) values are quantized to 8-bit integer (INT8) values to reduce the size of the numerical values of the model to one fourth of the bitwidth of the unquantized model.

In some implementations, the architecture of the model is modified to support the quantization by including additional layers that convert floating-point inputs to integer values, perform the matrix operations using the integer values, and convert the integer values output by the quantized convolution layer to floating-point values. A technical benefit of this approach is that the quantized convolution layer can receive the same floating-point inputs that would be received by a standard convolutional layer and outputs a similar floating-point output as the standard convolutional model. In the example shown in FIG. 3E, the pre-quantized convolution layer 334 is represented, in part, by the graph 336, and the quantized convolution layer 338 is represented, in part, by the graph 340. The graph 340 includes four layers that replace the conventional convolution layer of the graph 336. In this example implementation, these layers include a quantization layer for quantizing the input from a floating-point value to an integer value, a dequantization layer for de-quantizing the integer output, a dequantization layer for the bias (b) of the convolutional layer, and a dequantization layer for the weight (W) of the dequantization layer. Other implementations may include a different number of layers to implement the quantization.

The performance of the compressed models can also be improved through data augmentation. Data augmentation is used to generate training data that is similar to the types of data the model is likely to encounter when in use by end users. In instances where the model being trained is a shape-classification model, the training data may be augmented to include multiple variations of sample hand drawn shapes. These samples may be flipped horizontally or vertically, rotated, and/or have perspective distortion applied to create more relevant training data for training the model. A technical benefit of data augmentation is the performance of the models can be improved to offsets the slight decreases in accuracy of the models resulting from compression of the models. The augmented training data is used to train the uncompressed version of the model in some implementations, and the compressed version of the model derived from the uncompressed version of the model also benefits from the improvement in accuracy resulting from the data augmentation.

Figure 4:
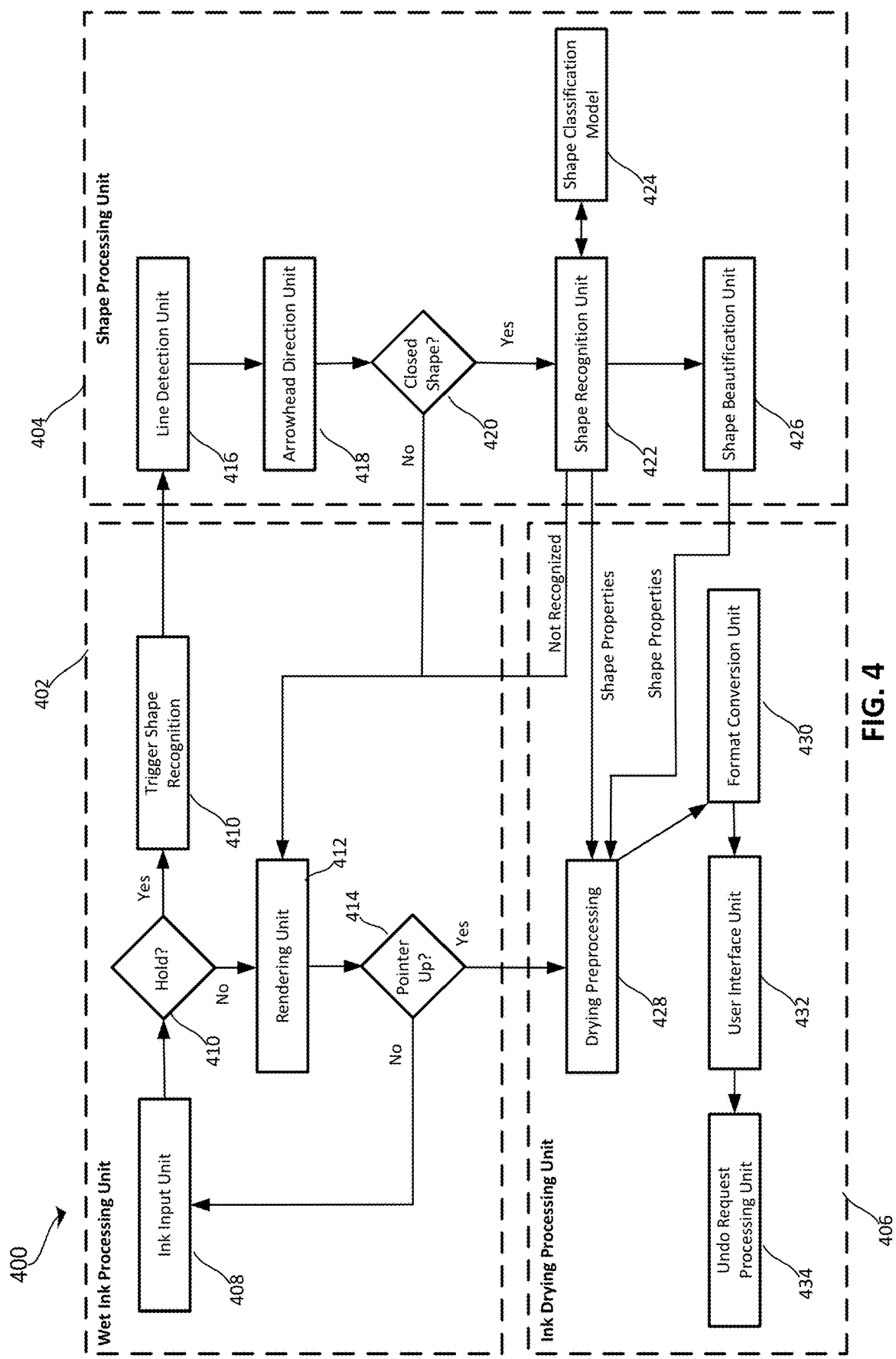
FIG. 4 is a diagram showing an example architecture for implementing an ink processing pipeline in a native application on the client device.

FIG. 4 is a diagram showing an example architecture 400 for implementing an ink processing pipeline in a native application on the client device 105, such as the native application 250 shown in FIG. 2. The ink processing pipeline is implemented in three phases: the wet ink processing unit 402, the shape processing unit 404, and the ink drying processing unit 406. The wet ink processing unit 402 is configured to analyze ink stroke information received from an input device of the client device 105, such as but not limited to a touch screen, a digital pen, a mouse, or other input device. The wet ink processing unit 402 determines whether the user is drawing a shape and triggers the shape processing unit 404 to process the ink stroke information. The ink drying processing unit 406 finalizes the rendering of the ink strokes, including the rendering of any shapes that were represented by the ink stroke information.

Figure 5A:
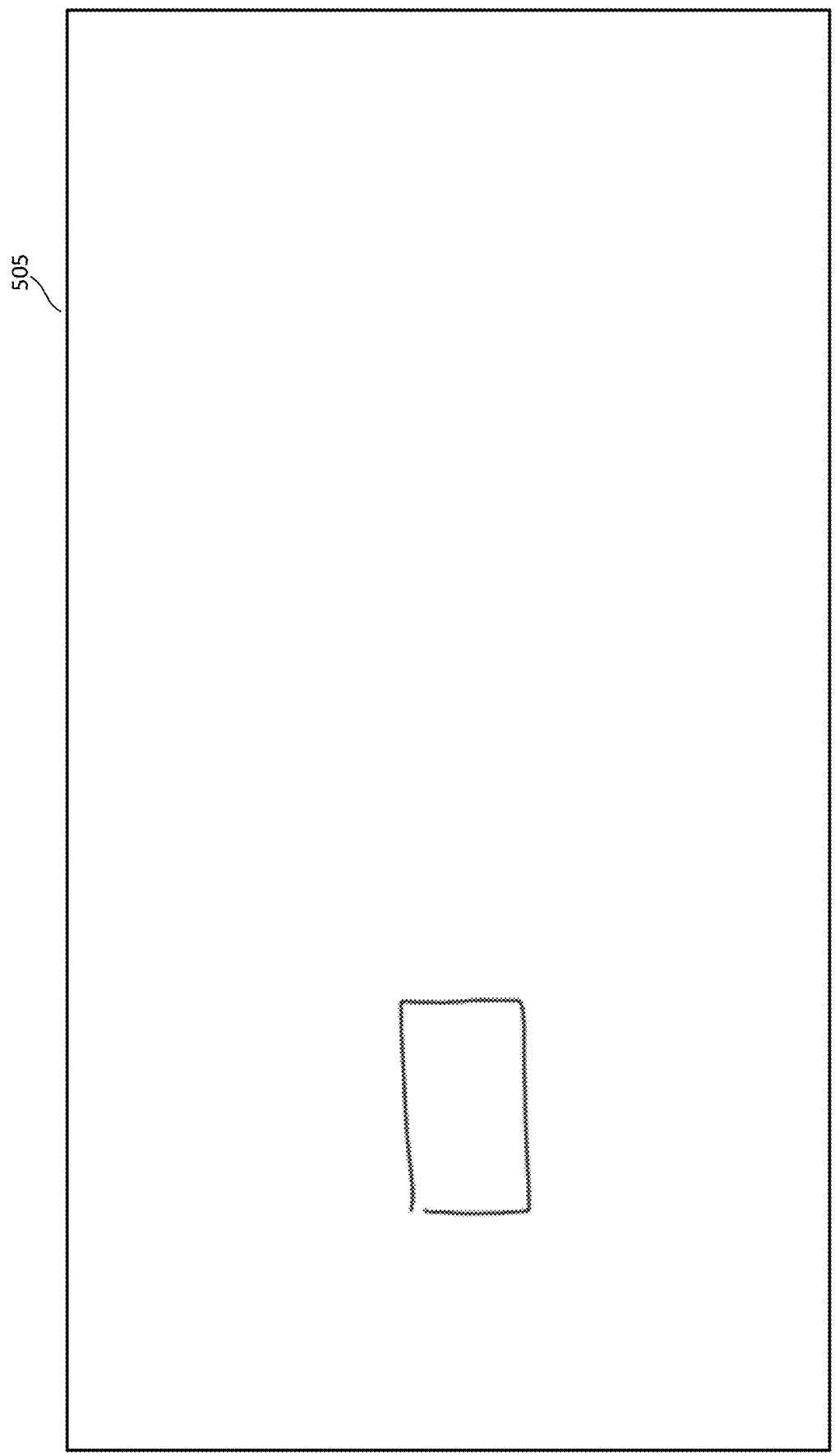
FIGS. 5A-5D are diagrams of an example user interface of a whiteboard application implemented on a client device that utilizes the techniques disclosed herein for shape recognition in digital ink stroke information.

The wet ink processing unit 402 includes an ink input unit 408 that is configured to receive ink stroke information from the input device of the client device 105. The ink stroke information received by the ink input unit 408 is provided to the hold determination unit 410 to determine whether the user is performing a "draw and hold" action in which the user maintains pressure on the touch screen using the digital pen or mouse and draws the shape using a series of substantially continuous ink strokes. To illustrate this concept, suppose that the user is drawing a rectangle. The user applies pressure to the touchscreen and draws a first side of the rectangle. The user then continues to maintain pressure on the touchscreen and draws the second side of the rectangle. This process continues for the third and fourth sides of the rectangle, such that the user draws the rectangle using a series of four substantially continuous ink strokes. FIG. 5A shows an example of such a hand drawn rectangle on a whiteboard user interface implemented by an example native application 250 on the client device 105.

The hold determination unit 410 may determine that the user is drawing a shape using the draw and hold approach where the user continues to maintain pressure but changes the direction in which the user is drawing beyond a predetermined threshold. The trigger shape recognition unit 410 collects the ink stroke information and provides the ink stroke information to the shape processing unit 404 responsive to determining that the user is drawing a shape using the draw and hold approach. Otherwise, the user is not drawing a shape, and the ink stroke information is provided to the rendering unit 412. The rendering unit 412 is configured to prepare the ink stroke for rendering on the user interface of the client device 105, such as the user interface 505. This enables the user to see the ink stroke on the user interface of client device as they are drawing the ink stroke. The pointer up unit 414 determines whether the user has stopped applying pressure to the touchscreen or released the button used to initiate the drawing of the ink stroke. If the user continues to draw the ink stroke, the pointer up unit 414 redirects to the ink input unit 408 which continues to capture the ink stroke information input by the user. Otherwise, the ink stroke information is provided to the ink drying processing unit 406 to finalize the ink strokes.

The shape processing unit 404 provides the ink stroke information to the line detection unit 416. The line detection unit 416 detects the lines that make up the shape being drawn by the user. Once the lines have been detected, the arrowhead direction unit 418 detects any arrowheads that were included in the drawing and determines the direction that these arrowheads are pointing. The drawing may not include any arrows in some instances, and the arrowhead direction unit 418 outputs an indication that there are no arrowheads present in the drawing in such instances. The closed shape determination unit 420 determines whether the drawing includes a closed shape, such as a circle or polygon. This determination may be made based on the starting and ending ink strokes overlapping, which may depend on the angles of the lines relative to one another, and/or other features of the ink stroke information that are indicative of the user having drawn or attempted to draw a closed shape. If the shape is not a closed shape, the user may be drawing a curve, line, or other such open shape, and the closed shape determination unit 420 provides an indication to the rendering unit 412 to render the ink stroke data. Otherwise, the closed shape determination unit 420 provides the ink stroke information to the shape recognition unit 422. The shape recognition unit 422 provides the ink stroke information as an input to the shape classification model 424. The shape recognition unit 422 may preprocess the ink stroke information to extract feature information from the ink stroke information and to format the feature information into a format that can be interpreted by the shape classification model 424. The shape classification model 424 may be a CNN or other deep learning model. The shape classification model 424 may be implemented by the compressed model 295 shown in FIG. 2. The shape classification model 424 outputs an indication of a shape represented in the ink stroke information or an indication that no shape has been recognized. The shape recognition unit 422 receives the output of the shape classification model 424. The shape recognition unit 422 sends an indication to the rendering unit 412 to render the ink stroke data responsive to no known shape being recognized by the shape classification model 424. Alternatively, if a shape is recognized, the shape recognition unit 422 provides the shape properties to the drying preprocessing unit 428 of the ink drying processing unit 406.

Figure 5B:
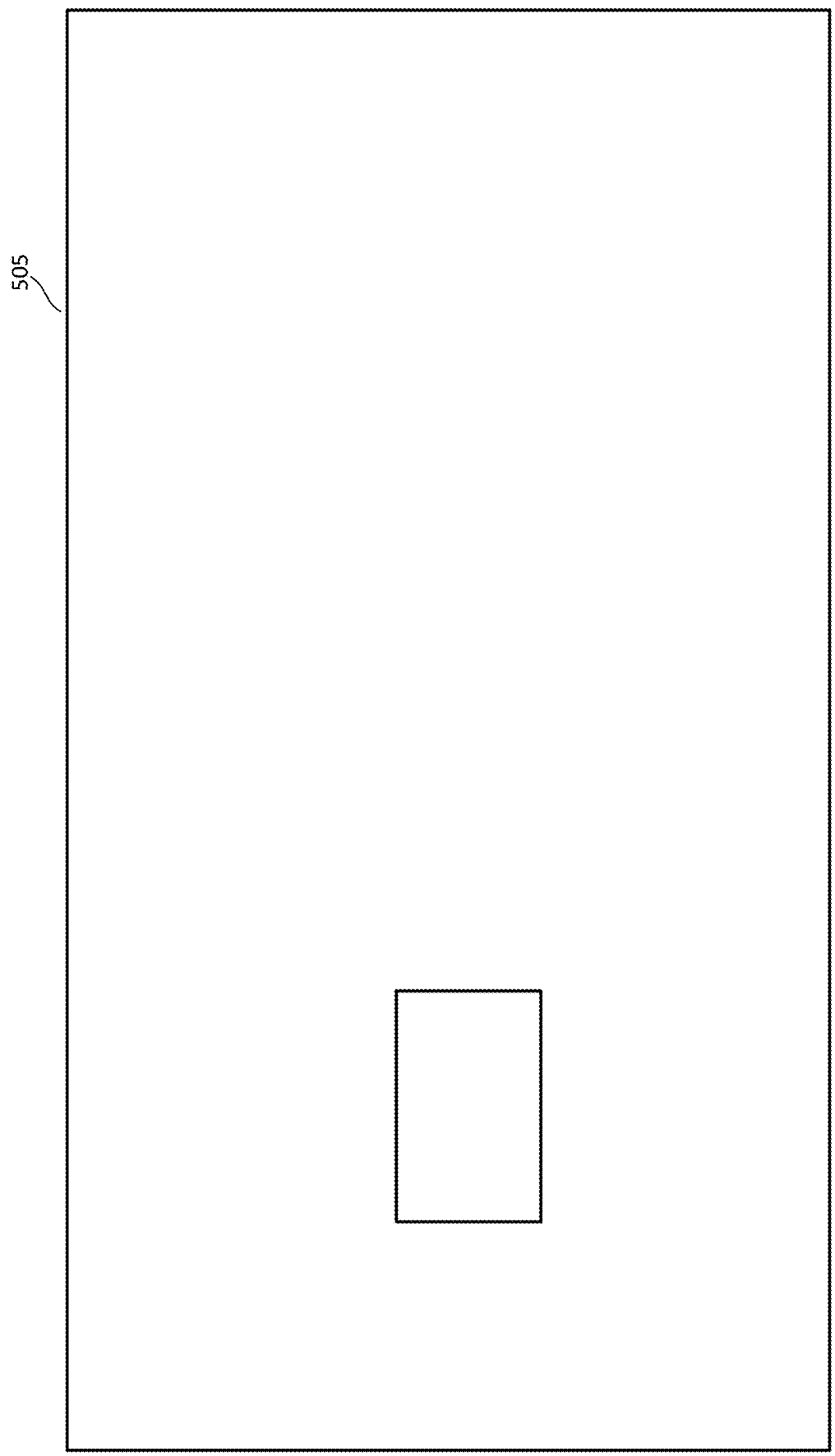
Figure 5C:
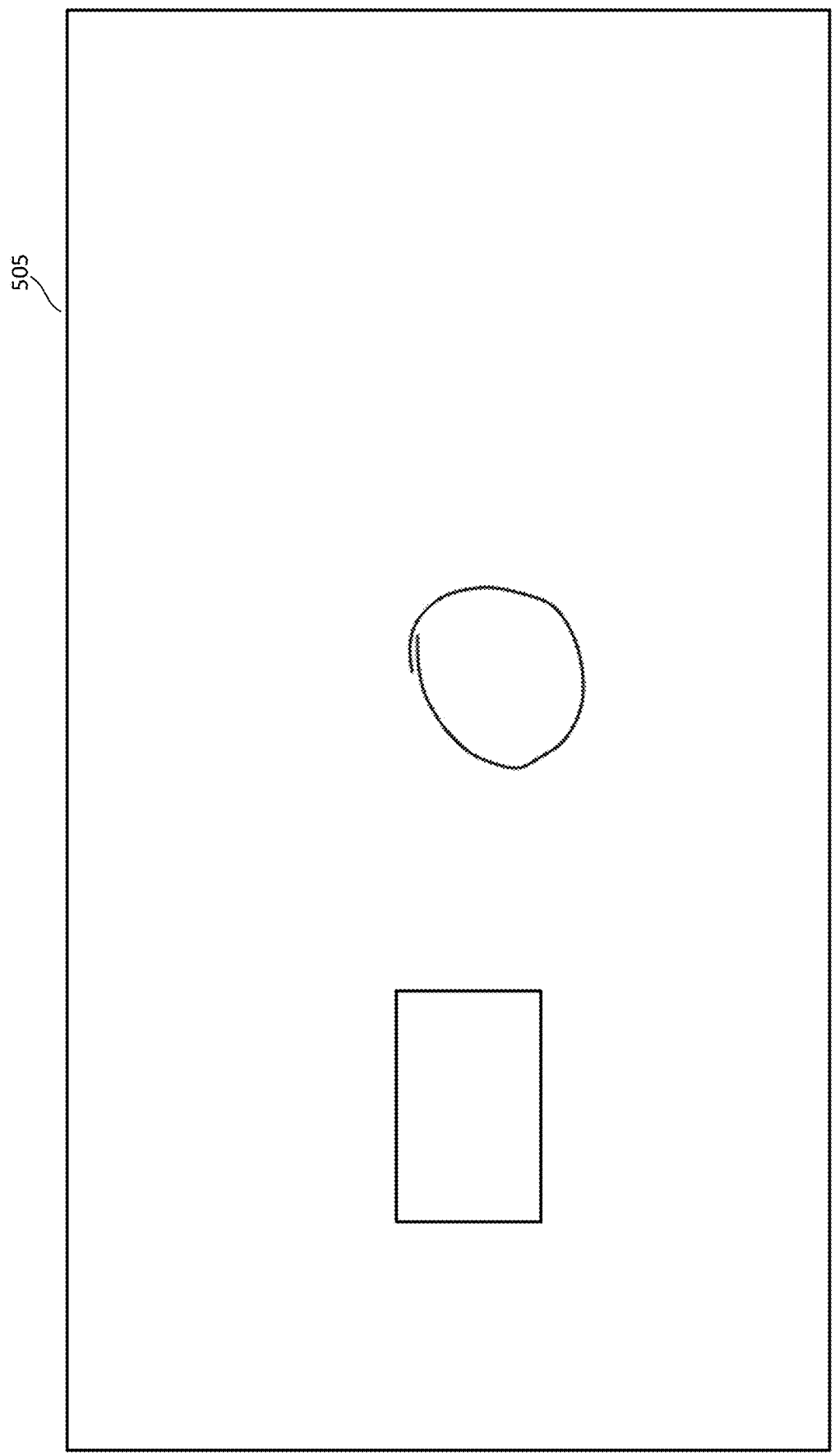
Figure 5D:
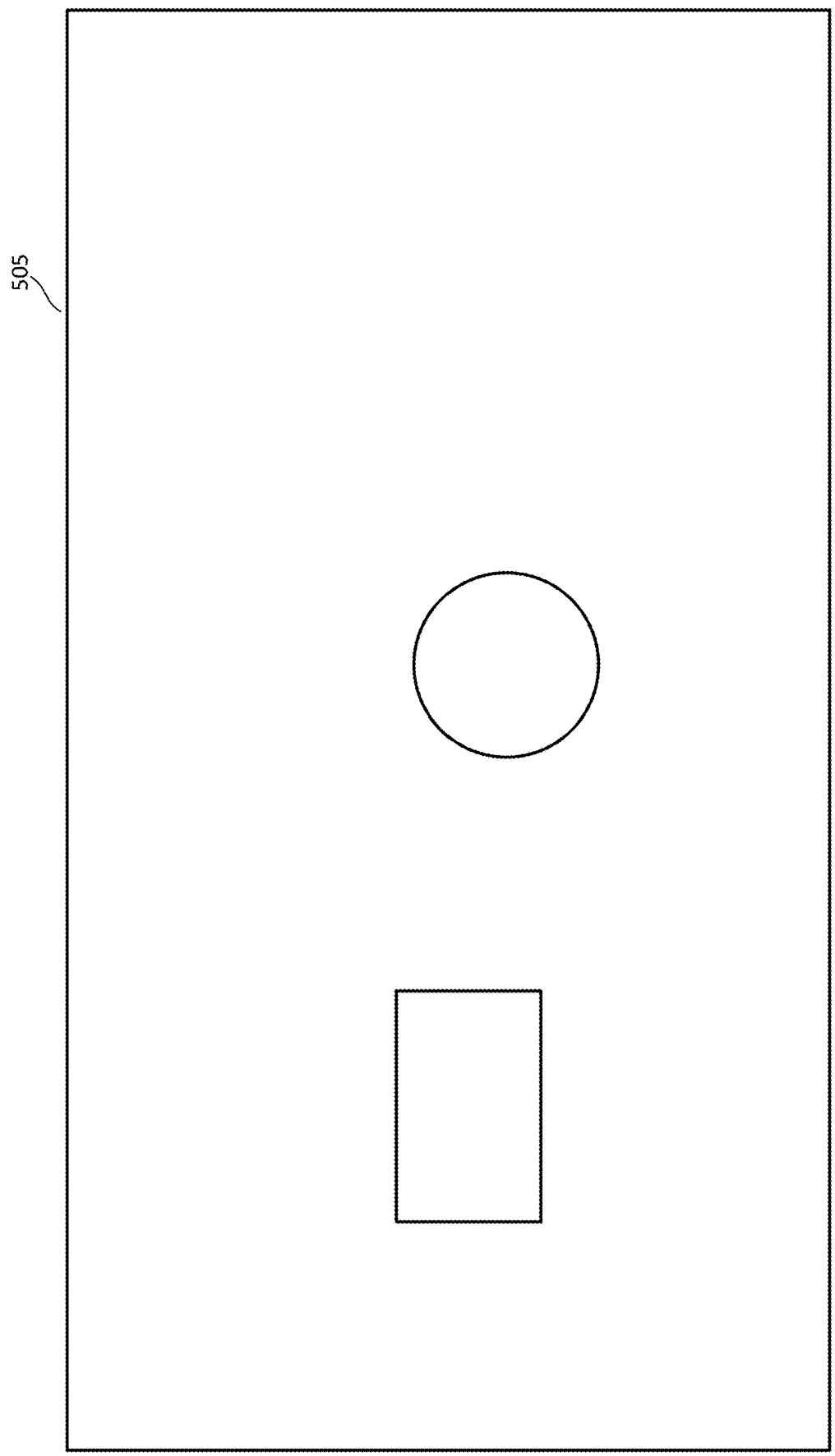

The ink drying processing unit 406 is configured to convert ink stroke information received from the user to formalized renderings of the shapes in response to the shape classification model 424 determining that the ink stroke information includes a closed shape. The drying preprocessing unit 428 derives information from the ink stroke information for rendering the formalized version of the geometric object, such as the size of the geometric object, the line width and/or color, the position of the geometric object on the drawing canvas of the user interface 505, and/or other attributes of the geometric object. The drying preprocessing unit 428 marks the ink stroke information associated with the shape for removal. The output of the drying preprocessing unit 428 is provided to the format conversion unit 430 which generates an instance of the geometric object identified in the ink stroke data. The object information is provided to the user interface unit 432 which removes the ink strokes associated with the shape from the user interface 505 and renders the formalized version of the shape in place of the ink strokes associated with the shape. An example of such a replacement is shown in FIG. 5B, in which the hand drawn rectangle shown in FIG. 5A has been replaced with a formalized version of the rectangle. FIGS. 5C and 5D provide another example in which the user has drawn a circle and the hand drawn circle is replaced with a formalized version of circle. The undo processing unit 434 listens for an undo command input by the user. The user can issue an undo command to revert the geometric shape back to the corresponding ink strokes. In a non-limiting example, if the user were to issue an undo command in the example shown in FIG. 5B, the undo processing unit 434 would revert back to the hand drawn rectangle shown in FIG. 5A. Thus, the user can revert any changes that were automatically made by the ink processing pipeline.

FIGS. 5A-5D show an example user interface 505 of a whiteboard application that may be implemented by the native application 250 of the client device 105. In other implementations, other types of applications can be implemented on the client device 105 that provide users with the ability to write and/or draw using digital ink. The examples shown in FIGS. 5A-5D show an example implementation of the shape-recognition and replacement functionality that is described in the previous examples. However, the client device 105 may include local instances of compressed models that have been trained to perform other types of tasks, such as but not limited to scaling and rotation of shapes, drawings, text, and/or handwriting. The local instances of the compressed models may also be configured to perform other types of image processing and/or classification tasks.

Figure 6A:
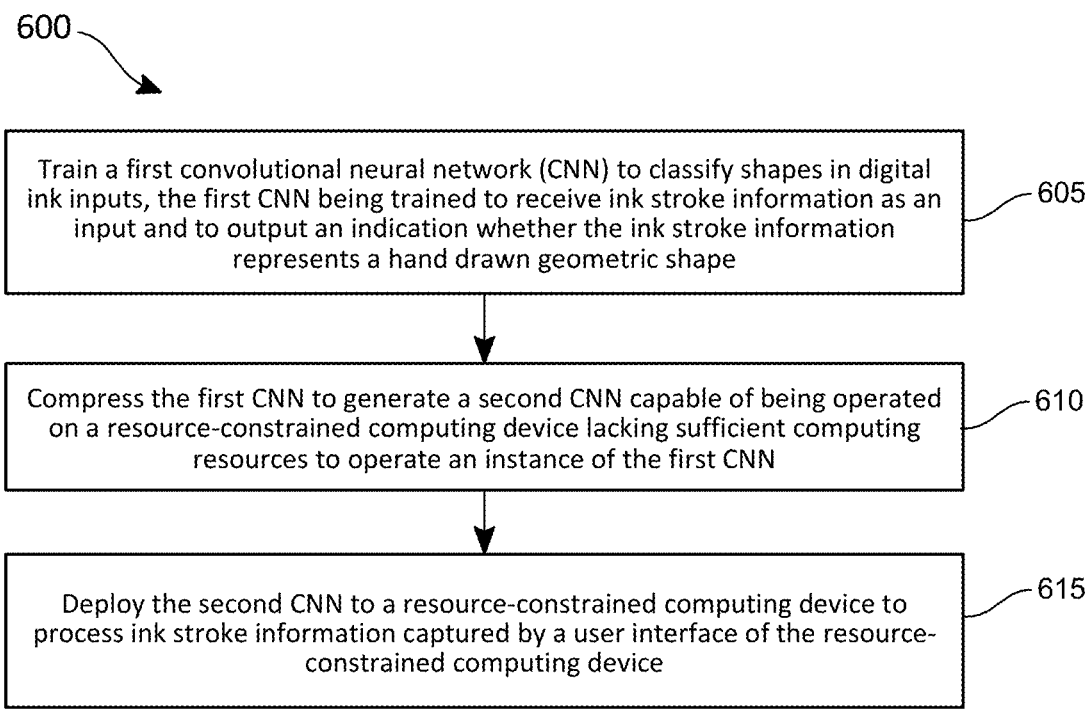
FIG. 6A is an example flow chart of an example process for generating an instance of a machine learning model that can be implemented on a resource-constrained device.

FIG. 6A is an example flow chart of an example process 600 for generating an instance of a machine learning model that can be implemented on a resource-constrained device. The process 600 includes an operation 605 of training a first convolutional neural network (CNN) to classify shapes in digital ink inputs, the first CNN being trained to receive ink stroke information as an input and to output an indication of whether the ink stroke information represents a hand drawn geometric shape. The first CNN may be implemented on the ink processing service 110 or other cloud-based services that has sufficient computing resources available to implement an instance of such a large machine learning model.

The process 600 includes an operation 610 of compressing the first CNN to generate a second CNN capable of being operated on a resource-constrained computing device. The resource-constrained computing device lacks sufficient computing resources to operate an instance of the first CNN. The process 600 includes an operation 615 of deploying the second CNN to a resource-constrained computing device to process ink stroke information captured by a user interface of the resource-constrained computing device. The resource-constrained computing device may be a resource-constrained client device 105 shown in the preceding examples. The resource-constrained client device 105 may experience network connectivity limitations that preclude the usage of a cloud-based service for analyzing ink stroke data, such as the ink processing service 110, due to latency resulting from the network connectivity limitations. To address this problem, the models used by the ink processing service 110 are implemented as local copies of these models on the client device 105 instead of the ink processing service 110. However, the client device 105 does not have sufficient computing resources to implement an instance of the first CNN model. A compressed version of the CNN can, however, be implemented using the various techniques provided herein to generate a second CNN that can be implemented locally on the client device 105 without unduly impacting the accuracy of the model.

Figure 6B:
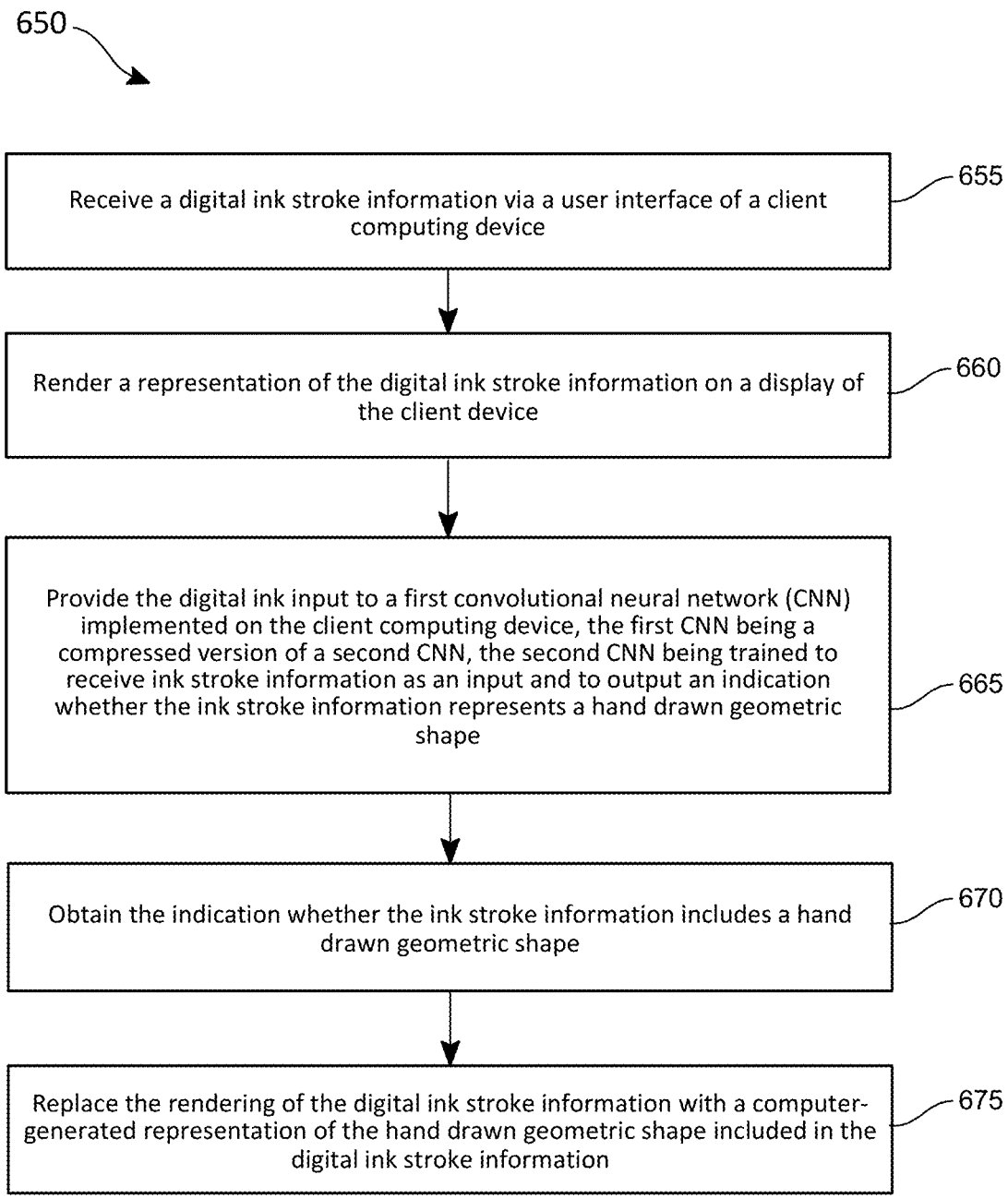
FIG. 6B is an example flow chart of an example process for operating an instance of a compressed machine learning model on a resource-constrained device.

FIG. 6B is an example flow chart of an example process 650 for operating an instance of a compressed machine learning model on a resource-constrained device. The process 600 includes an operation 655 of receiving a digital ink stroke information via a user interface of a client device. As discussed in the preceding examples, the client device 105 can provide various user interface elements, such as but limited to a touch screen, a digital pen, a mouse, or other input device that a user of the client device 105 can use to draw or write using digital ink.

The process 600 includes an operation 660 of rendering a representation of the digital ink stroke information on a display of the client device. As discussed in the preceding examples, a representation of the ink strokes can be rendered on a user interface of the client device as the user draws or writes using the digital ink.

The process 600 includes an operation 665 of providing the digital ink stroke information to a first convolutional neural network (CNN) implemented on the client device. The first CNN is a compressed version of a second CNN, because the client device lacks sufficient computing resources to operate an uncompressed instance of the second CNN. The second CNN is trained to receive ink stroke information as an input and to output an indication whether the ink stroke information represents a hand drawn geometric shape.

The process 600 includes an operation 670 of obtaining the indication whether the ink stroke information includes a hand drawn geometric shape and an operation 675 of replacing the rendering of the digital ink stroke information with a computer-generated representation of the hand drawn geometric shape included in the digital ink stroke information. As discussed in the preceding examples, the hand drawn shapes can be replaced by a cleanly rendered computer-generated representation of that shape. Examples of such a replacement of hand drawn shapes are shown in FIGS. 5A-5D.

The detailed examples of systems, devices, and techniques described in connection with FIGS. 1-6B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
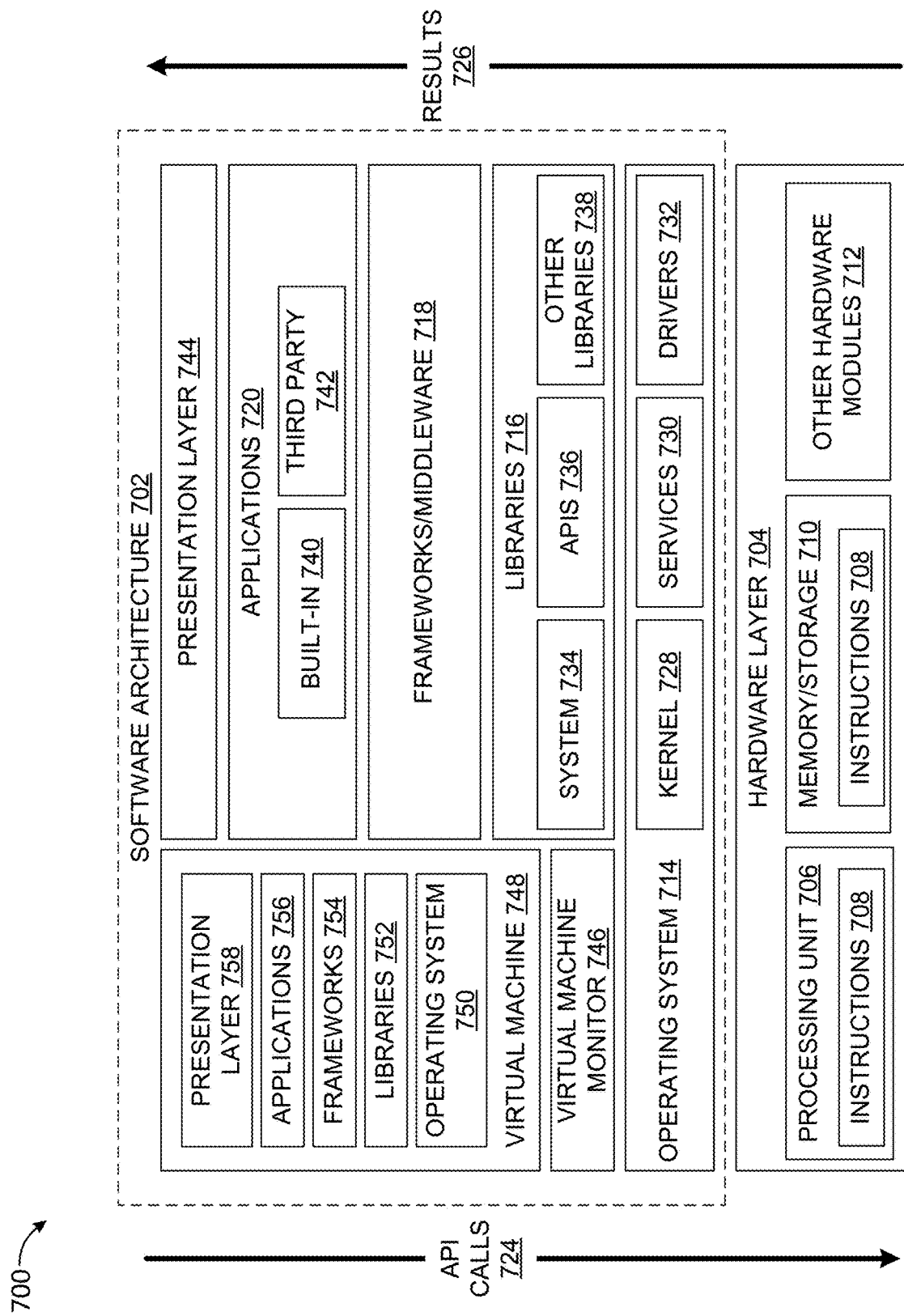
FIG. 7 is a block diagram showing an example software architecture, various portions of which may be used in FIG. 8 is a block diagram showing components of an example machine configured to read instructions from a machine-readable medium and perform any of the features described herein.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
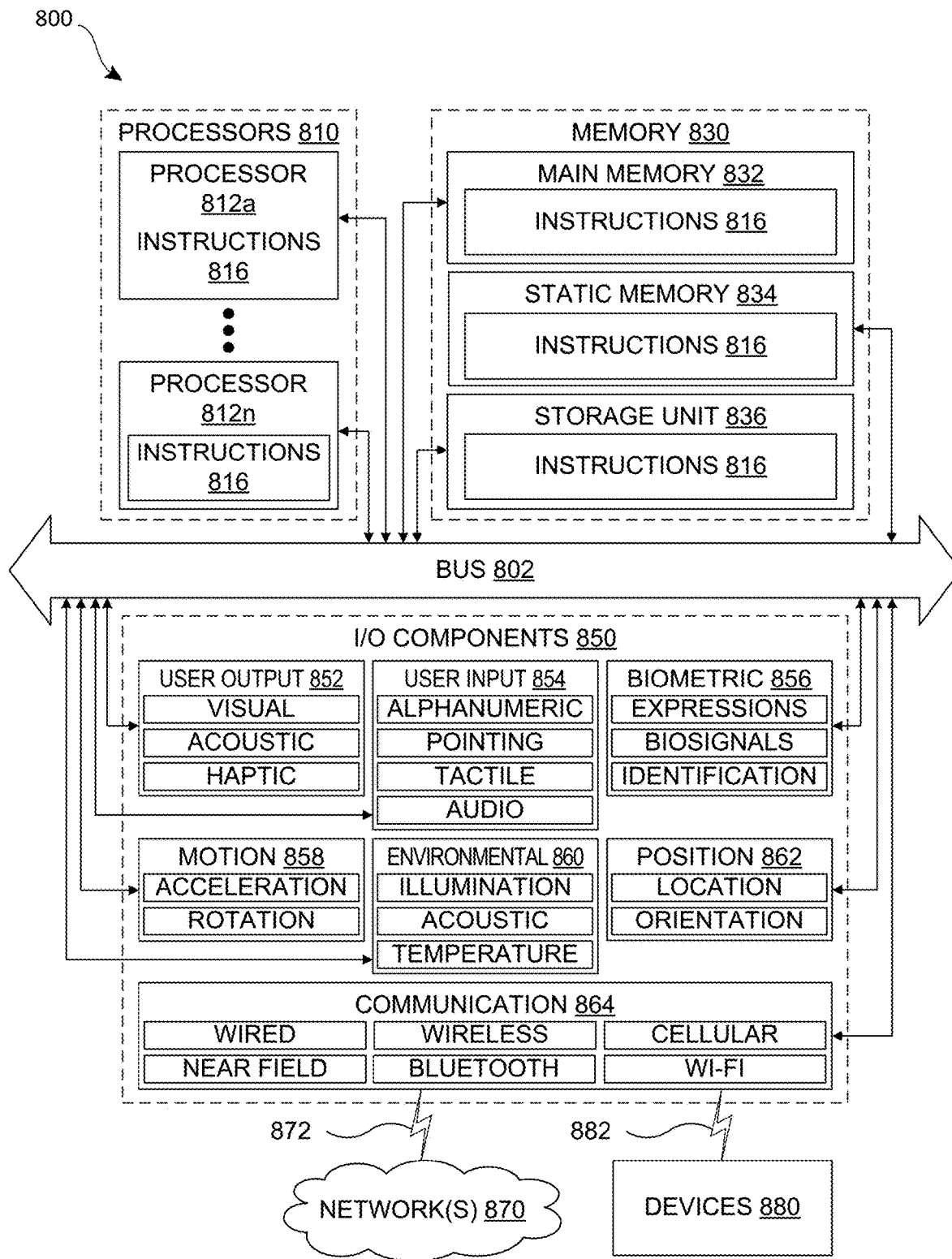

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810

(for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable medium storing executable instructions that, when executed, cause the processor to perform operations comprising:
training a first convolutional neural network (CNN) to classify shapes in digital ink inputs, the first CNN being trained to receive ink stroke information as an input and to output an indication whether the ink stroke information represents a hand drawn geometric shape;
compressing the first CNN to generate a second CNN capable of being operated on a resource-constrained computing device; and
deploying the second CNN to a resource-constrained computing device including an ink stroke processing pipeline to process ink stroke information captured by a user interface of the resource-constrained computing device, the ink stroke processing pipeline comprising a closed shape determination unit configured to determine whether the ink stroke information includes a hand-drawn closed geometric shape by analyzing the ink stroke information to determine whether starting and ending ink strokes in the ink stroke information overlap, the ink stroke processing pipeline providing the ink stroke information as an input to the second CNN responsive to the closed shape determination unit determining that the ink stroke information includes a hand-drawn closed geometric shape to cause the second CNN to analyze the ink stroke information and to output an indication of a type of geometric shape of the hand-drawn closed geometric shape, the ink stroke processing pipeline deriving shape attribute information from the ink stroke information responsive to the second CNN outputting the indication of the type of geometric shape of the hand-drawn closed geometric shape, the shape attribute information including a line width, color, or both line width and color from the ink stroke information, and rendering a computer-generated representation of the hand drawn geometric shape using the line width, the color, or both the line width and color of the hand-drawn closed geometric shape.

2. The data processing system of claim 1, wherein the resource-constrained computing device lacks sufficient computing resources to operate an instance of the first CNN.

3. The data processing system of claim 1, wherein compressing the first CNN to generate the second CNN further comprises:
replacing a standard convolution layer of the first CNN with a depthwise separable convolution layer.

4. The data processing system of claim 1, wherein compressing the first CNN to generate the second CNN further comprises:
reducing a size of a convolution layer of the first CNN by eliminating one or more filters from the convolution layer.

5. The data processing system of claim 1, wherein compressing the first CNN to generate the second CNN further comprises:

quantizing a convolution layer of the first CNN by modifying the convolution layer to perform matrix calculations using integer values rather than floating point values.

6. The data processing system of claim 4, wherein compressing the first CNN to generate the second CNN further comprises:
modifying the first CNN to include an input conversion layer for converting floating point input values to integer values and an output conversion layer configured to convert integer value outputs of the convolution layer to floating point values.

7. The data processing system of claim 1, wherein compressing the first CNN to generate the second CNN further comprises:
pruning one or more layers from the first CNN associated with training of the first CNN.

8. The data processing system of claim 1, wherein training the first CNN further comprises:
obtaining first training data for the first CNN;
augmenting the first training data by transforming examples included in the first training data to generate augmented first training data; and
training the first CNN using the augmented first training data.

9. A data processing system comprising:
a processor; and
a machine-readable medium storing executable instructions that, when executed, cause the processor to perform operations comprising:
receiving, at an ink stroke processing pipeline, a digital ink stroke information via a user interface of a client device;
rendering, using the ink stroke processing pipeline, a representation of the digital ink stroke information on a display of the client device;
analyzing the digital ink stroke information using a closed shape determination unit of the ink stroke processing pipeline to determine whether the digital ink stroke information includes a hand-drawn closed geometric shape by analyzing the digital ink stroke information to determine whether starting and ending ink strokes in the digital ink stroke information overlap;
providing the digital ink stroke information to a first convolutional neural network (CNN) implemented on the client device responsive to the closed shape determination unit determining that the digital ink stroke information includes a hand-drawn closed geometric shape, the first CNN being a compressed version of a second CNN, the second CNN being trained to receive ink stroke information as an input and to output an indication whether the ink stroke information represents a hand drawn geometric shape;
obtaining, at the ink stroke processing pipeline, the indication whether the ink stroke information includes a hand drawn geometric shape;
responsive to obtaining the indication that the ink stroke information includes the hand drawn geometric shape, deriving shape attribute information from the ink stroke information using the ink stroke processing pipeline, the shape attribute information including a line width, color, or both line width and color from the ink stroke information; and
replacing, using the ink stroke processing pipeline, the representation of the digital ink stroke information with a computer-generated representation of the hand-drawn closed geometric shape included in the digital ink stroke information based on the shape attribute information derived from the ink stroke information.

10. The data processing system of claim 9, wherein the client device is a resource-constrained computing device that lacks sufficient computing resources to operate an uncompressed instance of the second CNN.

11. The data processing system of claim 9, wherein compressing the first CNN to generate the second CNN further comprises:
replacing a standard convolution layer of the first CNN with a depthwise separable convolution layer.

12. The data processing system of claim 9, wherein compressing the first CNN to generate the second CNN further comprises:
reducing a size of a convolution layer of the first CNN by eliminating one or more filters from the convolution layer.

13. The data processing system of claim 9, wherein compressing the first CNN to generate the second CNN further comprises:
quantizing a convolution layer of the first CNN by modifying the convolution layer to perform matrix calculations using integer values rather than floating point values.

14. The data processing system of claim 13, wherein compressing the first CNN to generate the second CNN further comprises:
modifying the first CNN to include an input conversion layer for converting floating point input values to integer values and an output conversion layer configured to convert integer value outputs of the convolution layer to floating point values.

15. The data processing system of claim 9, wherein compressing the first CNN to generate the second CNN further comprises:
pruning one or more layers from the first CNN associated with training of the first CNN.

16. A method implemented in a data processing system for training a machine learning model, the method comprising:
training a first convolutional neural network (CNN) to classify shapes in digital ink inputs, the first CNN being trained to receive ink stroke information as an input and to output an indication whether the ink stroke information represents a hand drawn geometric shape;
compressing the first CNN to generate a second CNN capable of being operated on a resource-constrained computing device lacking sufficient computing resources to operate an instance of the first CNN; and
deploying the second CNN to a resource-constrained computing device including an ink stroke processing pipeline to process ink stroke information captured by a user interface of the resource-constrained computing device, the ink stroke processing pipeline comprising a closed shape determination unit configured to determine whether the ink stroke information includes a hand-drawn closed geometric shape by analyzing the ink stroke information to determine whether starting and ending ink strokes in the ink stroke information overlap, the ink stroke processing pipeline providing the ink stroke information as an input to the second CNN responsive to the closed shape determination unit determining that the ink stroke information includes a hand-drawn closed geometric shape to cause the second CNN to analyze the ink stroke information and to output an indication of a type of geometric shape of the hand-drawn closed geometric shape, the ink stroke processing pipeline deriving shape attribute information from the ink stroke information responsive to the second CNN outputting the indication of the type of geometric shape of the hand-drawn closed geometric shape, the shape attribute information including a line width, color, or both line width and color from the ink stroke information, and rendering a computer-generated representation of the hand drawn geometric shape using the line width and the color of the hand-drawn closed geometric shape.

17. The method of claim 16, wherein compressing the first CNN to generate the second CNN further comprises:
replacing a standard convolution layer of the first CNN with a depthwise separable convolution layer.

18. The method of claim 16, wherein compressing the first CNN to generate the second CNN further comprises:
reducing a size of a convolution layer of the first CNN by eliminating one or more filters from the convolution layer.

19. The method of claim 16, wherein compressing the first CNN to generate the second CNN further comprises:
quantizing a convolution layer of the first CNN by modifying the convolution layer to perform matrix calculations using integer values rather than floating point values.

20. The method of claim 19, wherein compressing the first CNN to generate the second CNN further comprises:
modifying the first CNN to include an input conversion layer for converting floating point input values to integer values and an output conversion layer configured to convert integer value outputs of the convolution layer to floating point values.

* * * * *